(12) United States Patent
Kaufman et al.

(10) Patent No.: US 8,752,144 B1
(45) Date of Patent: Jun. 10, 2014

(54) TARGETED BIOMETRIC CHALLENGES

(75) Inventors: Alon Kaufman, Bnei-Dror (IL); Yael Villa, Tel Aviv (IL); Yedidya Dotan, Tel Aviv (IL)

(73) Assignee: EMC Corporation, Hopkinton, MA (US)

(*) Notice: Subject to any disclaimer, the term of this patent is extended or adjusted under 35 U.S.C. 154(b) by 125 days.

(21) Appl. No.: 13/325,131

(22) Filed: Dec. 14, 2011

(51) Int. Cl.
*H04K 1/00* (2006.01)
*G06F 7/00* (2006.01)

(52) U.S. Cl.
USPC ............................... 726/6; 713/186; 704/200

(58) Field of Classification Search
USPC ............................... 726/6; 713/186; 704/200
See application file for complete search history.

(56) References Cited

U.S. PATENT DOCUMENTS

| 7,587,610 | B2 | 9/2009 | Chollet |
| 7,685,629 | B1 | 3/2010 | White et al. |
| 7,849,501 | B2 | 12/2010 | Vishik et al. |
| 7,865,937 | B1 | 1/2011 | White et al. |
| 7,877,611 | B2 | 1/2011 | Camacho et al. |
| 8,014,570 | B2 | 9/2011 | LeSaint et al. |
| 2002/0138743 | A1* | 9/2002 | Murakami et al. ............ 713/186 |
| 2008/0228767 | A1* | 9/2008 | Kenedy et al. .................... 707/6 |

* cited by examiner

*Primary Examiner* — Brandon Hoffman
*Assistant Examiner* — Samuel Ambaye
(74) *Attorney, Agent, or Firm* — BainwoodHuang

(57) ABSTRACT

An improved technique tailors a biometric challenge activity to a particular user. The particular user submits electronic input from which an authentication system extracts information concerning traits of the particular user; such traits can include keystroke and swiping patterns, handheld device positions, and place of origin. An authentication server maps values of user attributes such as place of origin, age, and UI device to the extracted traits. The authentication server then selects biometric challenges for the particular user based on user attributes having values which deviate most from a mean value of that attribute taken across a population of users. That is, the authentication server bases biometric challenges on the most distinguishing traits of the particular user.

9 Claims, 6 Drawing Sheets

32

| 40 Current Location | 42 Device Height | 44 Keystroke Speed | 46 Local Time |
|---|---|---|---|
| Tel Aviv | 140 cm | 70 wpm | 2:08 AM |

30

| 50 DOB | 52 Gender | 54 Height | 56 Origin |
|---|---|---|---|
| 1/20/1936 | Male | 190 cm | Boston |

| 60 Location | | |
|---|---|---|
| | True User | Fraudster |
| Correct Input | 0.96 | 0.04 |
| Incorrect Input | 0.01 | 0.99 |

| 62 Height | | |
|---|---|---|
| | True User | Fraudster |
| Correct Input | 0.91 | 0.09 |
| Incorrect Input | 0.02 | 0.98 |

| 64 Age | | |
|---|---|---|
| | True User | Fraudster |
| Correct Input | 0.86 | 0.14 |
| Incorrect Input | 0.09 | 0.91 |

| 66 Time | | |
|---|---|---|
| | True User | Fraudster |
| Correct Input | 0.76 | 0.24 |
| Incorrect Input | 0.16 | 0.84 |

Fig. 4(b)

70 

```
┌─────────────────────────────────────────┐
│ Identifying traits of the particular user from │
│ electronic input received from the particular │
│ user, the identified traits distinguishing the │
│ particular user among users of a user population │
│ 72                                       │
└─────────────────────────────────────────┘
```

```
┌─────────────────────────────────────────┐
│ Selecting a set of user attributes from a │
│ pool of user attributes based on the     │
│ identified traits of the particular user, each │
│ user attribute being an objectively      │
│ measurable feature of a user of the user │
│ 74              population               │
└─────────────────────────────────────────┘
```

```
┌─────────────────────────────────────────┐
│ Incorporating the set of user attributes │
│        into the challenge activity        │
│ 76                                       │
└─────────────────────────────────────────┘
```

Fig. 5

TARGETED BIOMETRIC CHALLENGES

BACKGROUND

Service providers receive authentication attempts from users wishing to gain access to sensitive information such as bank account data. Some users attempt to gain access to such information with credentials obtained fraudulently from a legitimate account holder.

Conventional authentication employs multiple factors. For example, in addition to the usual username/password combination, conventional authentication requires additional user input such as a response to a challenge. One type of challenge relates to personal questions that only the legitimate user should be able to answer correctly; another type of challenge is biometric in nature.

One example of a biometric challenge requires the user to repeat a randomly selected phrase into a microphone. Conventional authentication compares the voice signature of the spoken phrase to a voice signature corresponding to the legitimate user.

SUMMARY

Unfortunately, there are deficiencies with the above-described conventional authentication. For example, conventional authentication does not take into account particular features of a legitimate user when selecting a biometric challenge for identity verification. Specifically, suppose that a legitimate user from Boston sets up an account with a service provider. Conventional authentication selects a biometric challenge in the form of the phrase, "the quick brown fox" for the user to say and stores the voice response in a database. The selected phrase does not take advantage of specific quirks in speech that a legitimate user from Boston has (e.g., skipping "r" at the end of some words). As a consequence, it is possible for a fraudulent user in a city such as Tel Aviv (likely not from Boston) to produce a counterfeit response that is acceptable to the conventional authentication.

In contrast to conventional authentication which does not consider particular features of a user in selecting a biometric challenge for the user, an improved technique tailors a biometric challenge activity to a particular user. Along these lines, the particular user submits electronic input from which an authentication system extracts information concerning traits of the particular user; such traits can include keystroke and swiping patterns which indicates hand size, handheld device positions which indicates height, and place of origin which indicates a speech pattern. An authentication server maps values of user attributes such as place of origin, age, and device to the extracted traits. The authentication server then selects biometric challenges for the particular user based on user attributes having values which deviate most from a mean value of that attribute taken across a population of users. That is, the authentication server bases biometric challenges on the most distinguishing traits of the particular user.

Advantageously, with the improved technique, better authentication results are achieved. In particular, the selected biometric challenges allow a service provider to reduce the amount of false positives (i.e., allowing access to a user other than the legitimate user) that result from biometric challenges. For example, suppose that a legitimate user registers an account with a banking institution and, in doing so, provides information that he is a 75 year-old male from Boston. Sometime later, a user submits a request to the banking institution for access to the account. The request is determined to originate from Tel Aviv. In this case, the improved technique, upon determining that a challenge activity is needed for authentication, selects a biometric challenge in the form of a phrase such as "park the car in Harvard yard" which emphasizes particular speech patterns of the legitimate user. The improved technique selects this specific phrase because the likelihood of someone from Tel Aviv speaking the phrase the same way as someone from Boston is low. With this selected biometric challenge, better authentication results are achieved.

One embodiment of the improved technique is directed to a method of tailoring a challenge activity to a particular user. The method includes identifying traits of the particular user from electronic input received from the particular user, the identified traits distinguishing the particular user among users of a user population. The method also includes selecting a set of user attributes from a pool of user attributes based on the identified traits of the particular user, each user attribute being an objectively measurable feature of a user of the user population. The method further includes incorporating the set of user attributes into the challenge activity.

Additionally, some embodiments of the improved technique are directed to a system for tailoring a challenge activity to a particular user. The system includes a network interface coupled to a network, a memory and processing circuitry coupled to the memory, the processing circuitry configured to carry the method of tailoring a challenge activity to a particular user.

Furthermore, some embodiments of the improved technique are directed to a computer program product having a non-transitory computer readable storage medium which stores code including a set of server instructions to carry the method of tailoring a challenge activity to a particular user.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 4 is a set of attributes and respective values that are considered by the collection circuitry of the authentication server of FIG. 2.

FIG. 5 is a flow chart illustrating a method of carrying out the improved technique within the electronic environment shown in FIG. 1.

DETAILED DESCRIPTION

An improved technique tailors a biometric challenge activity to a particular user. The particular user submits electronic input from which an authentication system extracts information concerning traits of the particular user; such traits can include keystroke and swiping patterns, handheld device positions, and place of origin. An authentication server maps values of user attributes such as place of origin, age, and device to the extracted traits. The authentication server then selects biometric challenges for the particular user based on user attributes having values which deviate most from a mean value of that attribute taken across a population of users. That is, the authentication server bases biometric challenges on the most distinguishing traits of the particular user.

Advantageously, the improved technique allows a service provider to reduce the amount of false positives (i.e., allowing access to a user other than the legitimate user) that result from biometric challenges. For example, suppose that a legitimate user registers an account with a banking institution and, in doing so, provides information that he is a 75 year-old male from Boston. Sometime later, a user submits a request to the banking institution for access to the account. The request is determined to originate from Tel Aviv. In this case, the improved technique, upon determining that a challenge activity is needed for authentication, selects a biometric challenge in the form of a phrase such as "park the car in Harvard yard" which emphasizes particular speech patterns of the legitimate user. The improved technique selects this specific phrase because the likelihood of someone from Tel Aviv speaking the phrase the same way as someone from Boston is low. With this selected biometric challenge, better authentication results are achieved.

Figure 1:
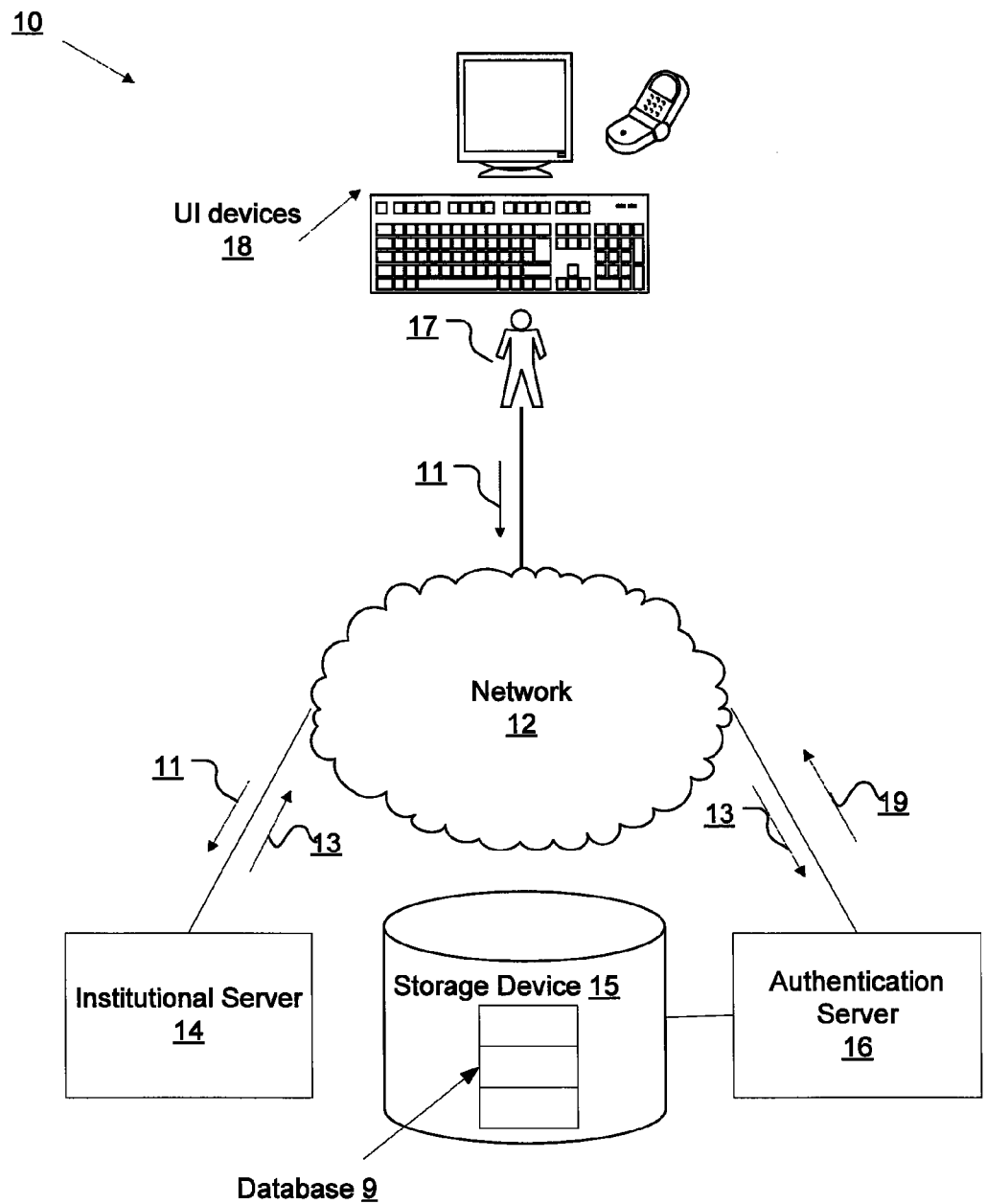
FIG. 1 is a schematic diagram illustrating an electronic environment for carrying out the improved technique.

FIG. 1 illustrates an electronic environment 10 for carrying out the improved technique. Electronic environment 10 includes communications medium 12, institutional server 14, authentication server 16, storage device 15, and UI device 18.

Communication medium 12 provides network connections between UI device 18, institutional server 14, and authentication server 16. Communications medium 12 may implement a variety of protocols such as TCP/IP, UDP, ATM, Ethernet, Fibre Channel, combinations thereof, and the like. Furthermore, communications media 12 may include various components (e.g., cables, switches/routers, gateways/bridges, NAS/SAN appliances/nodes, interfaces, etc.). Moreover, the communications medium 12 are capable of having a variety of topologies (e.g., queue manager-and-spoke, ring, backbone, multi drop, point to-point, irregular, combinations thereof, and so on).

UI device 18 includes any device that a user 17 employs to send a request 11 to access account information to institutional server 14. UI device 18 includes desktop computers, laptops, table computers, smart phones, and personal digital assistants, although this list is not comprehensive. UI device 18 includes at least one component that allows for the collection of biometric data, or traits, such as keyboard, microphone, or telephone; other components include a touch screen, camera, or GPS. This list, however, is not exhaustive and other such components not listed above can be used. UI device 18 also includes components needed to run an application, such as a browser application, used to access account information of the legitimate user, and to send and receive data from institutional server 14.

Institutional server 14 is a server that controls access to protected data of an institution. For example, institutional server 14 is a server of the banking institution having the account of the legitimate user accessible via a browser application within a device. Institutional server 14 is constructed and arranged to receive request 11, submitted by user 17 via UI device 18, to access protected data. In response to receipt of request 11, institutional server 14 is constructed and arranged to send authentication requests 13 to authentication server 16.

Authentication server 16 provides authentication services to the banking institution so that institutional server 14 can make a decision as to whether user 17 is legitimate or fraudulent. Authentication server 16 is constructed and arranged to receive authentication request 13 from institutional server 14 and perform an authentication operation on data contained in request 13. Authentication server 16 is constructed and arranged to extract information from storage device 15 in the process of performing an authentication operation on data contained in request 13. Authentication server 16 is also constructed and arranged to select a challenge activity 19 using data contained in request 13.

Figure 2:
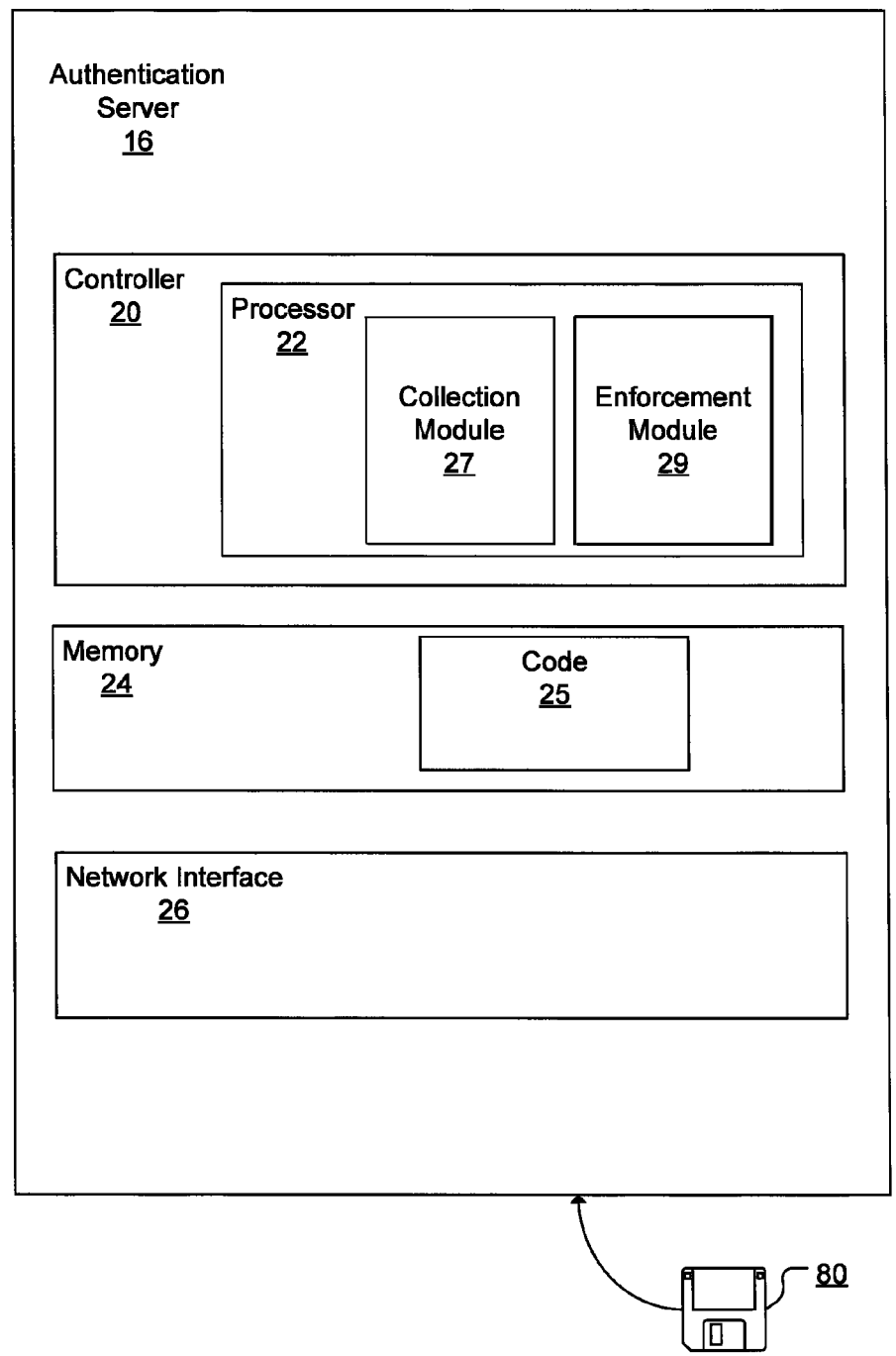
FIG. 2 is a schematic diagram illustrating the authentication server within the electronic environment shown in FIG. 1.

Further details concerning authentication server 16 are considered with respect to FIG. 2.

FIG. 2 illustrates components of authentication server 16. Authentication server 16 includes a controller 20 which in turn includes processor 22, a memory 24 and a network interface 26.

Memory 24 is configured to store code which includes instructions 25 to tailor a challenge activity to a particular user. Memory 24 is further configured to store data from request 13 (see FIG. 1). Memory 24 generally takes the form of, e.g., random access memory, flash memory or a non-volatile memory.

Processor 22 takes the form of, but is not limited to, Intel or AMD-based MPUs, and can include a single or multi-cores each running single or multiple threads. Processor 22 is coupled to memory 24 and is configured to execute instructions 25 stored in memory 24. Processor 22 includes a collection module 27 and an enforcement module 29.

Collection module 27 is constructed and arranged to collect attribute data from various sources. For example, collection module 27 reads in data from sources such as the U.S. National Institute of Health (NIH) and the U.K. National Health Service (NHS); such data provides baseline values of various attributes to be compared to attribute values for the legitimate user and user 17. Collection module 27 is also constructed and arranged to collect data from a user when the user sets up an account with the banking institution; such data includes static information about the user such as date of birth, gender, etc., as well as information about an organization to which the user associates, e.g., an employer. Collection module 27 stores static, organizational, and baseline data in database 9. Collection module 27 is further constructed and arranged to collect trait data from request 13.

Enforcement module 29 is constructed and arranged to select challenge activities based on information collected by collection module 27.

Network interface 26 is constructed and arranged to send and receive data over communications medium 12. Specifically, network interface 26 is configured to receive authentication request 13 from institutional server 14 over communications medium 12 and to send challenge activity to UI device 18 via institutional server 14. Also, network interface 26 is constructed and arranged to receive data from storage device 15.

Returning to FIG. 1, storage device 15 stores database 9 which contains information about user attributes for the legitimate user and all other users who have accounts registered with institutional server 14. Storage device 15 is constructed and arranged to provide information from database 9 to authentication server 16 via network interface 26 upon receipt of a request from authentication server 16.

Database 9 contains entries, each of which is associated either with a user who has an account registered with the banking institution or a baseline user. Database 9 includes a number (e.g., 200) of fields, each of which represents an attribute; each entry of database 9 includes values for each attribute field. As described above, attributes can either be static or dynamic; these attributes are compared to baseline attributes taken from bootstrap data from, e.g., NIH and NHS, and organization data representing demographic data concerning account holders at the bank.

During operation, user 17 sends, via a browser in UI device 18, request 11 to access account information to institutional server 14. Institutional server 14, upon receipt of request 11, sends request 13 to authenticate user 17 to authentication server 16. Request 13 contains data embedded in request 11 concerning the username of the account holder and traits of user 17 including location, keystroke pattern/speed information, height of device above floor (if UI device 18 is a handheld device), and submission time.

Authentication server 16 receives request 13 via network interface 26 and extracts, via collection module 27, the data concerning the traits of user 17. Upon receipt of request 13, collection module 27 locates user attribute data from database 9 which corresponds to the username. Collection module 27 maps the extracted traits to the user attribute data and generates a comparison result which it sends to enforcement module 29. Based on the comparison result, enforcement module 29 decides whether or not to select a challenge activity 19 for further authentication of user 17.

For example, suppose that a legitimate user, a tall male from Boston, has a bank account that is accessible online via a browser in a device. User 17 sends request 11 to access the bank account to institutional server 14 of the bank via UI device 18. Collection module 27 receives request 13 to perform an authentication operation from institutional server 14. Upon receipt of request 13, collection module 27 reads data in request 13; among the data is information that user 17 is located in Tel Aviv. Collection module 27 reads data stored in database 9 pertaining to the account and passes this data and the data in request 13 to enforcement module 29. Enforcement module 29 compares the location of Tel Aviv to the origin of the legitimate user, Boston, and categorizes this variance between location and origin as requiring a challenge activity. Enforcement module 28 then selects a challenge activity based on this variance; in this case, an appropriate challenge activity is to require user 17 to speak the phrase "park the car in Harvard yard," which exploits a difference in the English dialects between a person from Boston and a person from Tel Aviv.

Figure 3:
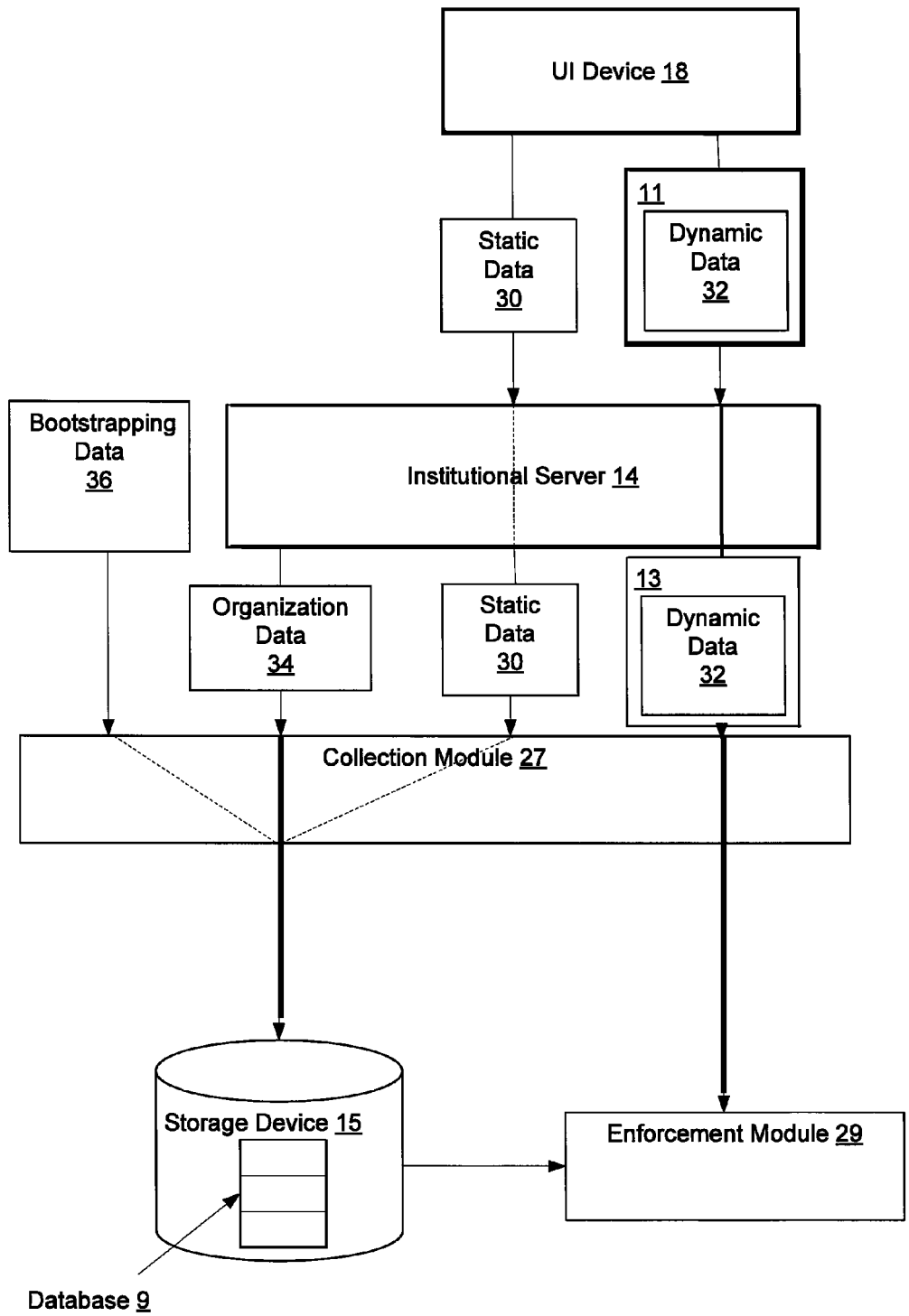
FIG. 3 is a schematic diagram illustrating attributes considered by the collection circuitry of the authentication server of FIG. 2.

Further details with respect to the selection of challenge activity 19 are considered with regard to FIGS. 3, 4(a), and 4(b).

FIG. 3 illustrates the collection of different types of data that collection module 27 translates into attribute values used in selecting challenge activities for authenticating user 17. Static data 30 is data which is typically collected once during the lifetime of an account, although updates to the data may be collected. Dynamic data 32 is data which is collected as part of submission of request 11 to access account data from institutional server 14, which in turn is submitted to authentication server as part of request 13 for authentication. Organization data 34 is data collected from institutional server 14 that concerns demographics of account holders of the banking institution; such data is collected from SAP and ERP databases, for example. Bootstrapping data 36 is data sampled from various public sources such as NIH and NHS, which is used to construct attribute values for an average user.

When a legitimate user (not necessarily user 17) opens an account with the banking institution, that legitimate user sends static data 30 via UI device 18 to institutional server 14. Static data 30 includes name, date of birth, social security number, and place of origin. In some arrangements, static data 30 includes physical traits such as gender, height, handedness, and image and voice data. Institutional server 14 then sends static data to authentication server. Collection module 27 within authentication server 16 then extracts attribute values from static data 30 and stores the attribute values in database 9.

When the legitimate user sends physical trait data to institutional server 14 and, ultimately, to authentication server 16, collection module 27 stores new attribute values corresponding to this trait data along with previous attribute values. In some arrangements, collection module 27 averages the new and previous attribute values; as will be described below, enforcement server 29 then operates on the averaged attribute values.

Meanwhile, institutional server 14 sends organization data 34 on a periodic (e.g., daily) basis to collection module 27. Organization data 34 includes data concerning age, residence, etc., of the account holders of the banking institution. For example, the banking institution may be a credit union having a regional base with typically elderly account holders. Because the user opens the account with the banking institution, data concerning the user is linked to organization data 34.

Also, collection module 27 acquires bootstrapping data 36 directly on a periodic (e.g., weekly) basis. Bootstrapping data 36 includes statistical data from which enforcement module 29 computes probability distributions for attribute values. For example, bootstrapping data 36 implies, that a male born in 1936 has a 1% chance of having a height exceeding 190 cm, a 5% chance of having a height exceeding 185 cm, a 50% chance of having a height exceeding 170 cm, and so on.

Collection module 27 stores bootstrapping data 36 and organization data 34 in database 9. In some arrangements, collection module 27 creates an entry in database 9 corresponding to an average user from this data. The average user has attribute values derived from bootstrapping data 36 and organization data 34; in addition, the average user has additional parameters for each user attribute value from which a probability distribution for that value may be derived. For example, each attribute value for the average user may have a variance value to which it corresponds. Specifically, suppose that the user attributes considered in the improved techniques are date of birth, height, place of origin, and gender. Organization data 34 and bootstrapping data 36, in a particular example, imply that, for the particular banking institution, there is a 3% probability of a customer from Boston having an account with the bank.

Enforcement module 29 then selects the user attributes from which it selects challenge activity 19 for the particular user by comparing user attribute values from static data 30 to average user attribute values. In some arrangements, enforcement module 29 performs a comparison by computing a difference between the attribute value from the static data 30 and the attribute value of the average user. In other arrangements, enforcement module 29 considers the probability, derived from the variance parameter corresponding to the attribute value of the average user, that the attribute value of the user is the attribute value derived from static data 30. For example, because the probability of a user being from Boston is 3%, such an attribute is used as a factor in selecting a challenge activity.

Enforcement module 29 selects challenge activities based on those most distinguishing attributes. For example, when location is the most distinguishing attribute, a challenge activity can be based on a dialect of that location. Specifically, suppose that the location is Boston; a possible challenge activity requires a user to speak the phrase "park the car in Harvard yard."

Collection module 27 collects dynamic data 32 when user 17 submits request 11. Dynamic data 32 includes typing speed, height at which UI device 18 is held (if a handheld device), type of device, and any other data collected as part of the submission of request 11. Dynamic data 32 goes to enforcement module 29 via institutional server 14. Enforcement module, upon receipt of dynamic data 32, refers to attribute data stored in database 9 in order to select a challenge activity that gauges the authenticity of user 17.

In some arrangements, collection module 27 combines dynamic data 32 with static data 30 in the sense of averaging the attribute values derived from dynamic data 32 into those associated with static data 30. Such combining allows for variations in attribute values to be considered in selecting challenge activity 19.

Referring back to FIG. 1, challenge activity 19 includes a request for user 17 to perform an action. For example, challenge 19 takes the form of a phone call to user 17 in which user 17 is required to speak a phrase into the phone. Enforcement module 29 selects such a challenge activity 19 such that the likelihood of a fraudulent user passing himself off as the legitimate user is minimized. How enforcement module 29 performs the selection will be discussed in detail with regard to FIGS. 4(a) and 4(b).

FIG. 4(a) shows examples of user attributes derived from static data 30 and traits derived from dynamic data 32. In this example, the user who set up the account has a date of birth 50 attribute value equal to "Jan. 20, 1936," has a gender 52 attribute value equal to "male," has a height attribute 54 value="190 cm," and has an origin attribute 56 value="Boston." User 17 who is attempting to access the account, on the other hand, has traits current location 40, with value "Tel Aviv"; device height 42, with value=140 cm; keystroke speed 44, with value=70 wpm; and local time 46 of submission of request 11, with value equal to 2:08 AM local time.

Collection module 27 maps traits of dynamic data 32 to attributes of static data 30 stored in database 9. For example, collection module 27 associates current location 40 with origin 56 and sends the associated pair to enforcement module 29, which performs a comparison operation on the associated pair. Specifically, enforcement module 29 determines that the likelihood of a user having an origin value of "Boston" having a current location of "Tel Aviv" is small. Enforcement module 29 then selects a challenge activity associated with the origin attribute.

In some arrangements, enforcement module 29 ranks each attribute of static data 30 according to the likelihood that a challenge activity based on the static attribute greatly reduces the chances of a false positive. An example of such a ranking is provided with regard to FIG. 4(b).

FIG. 4(b) shows an example of how a challenge activity is selected among several attributes. Fourfold tables corresponding to location 60, height 62, age 64, and time 66 attributes are illustrated. A fourfold table is a table of probabilities for each attribute in four scenarios: (Correct Input given True User), (Correct Input given Fraudster), (Incorrect Input given True User), and (Incorrect Input given Fraudster). The second of the above conditional probabilities corresponds to a false positive; the third corresponds to a false negative. "Input" is considered relative to a particular challenge activity.

To each attribute, or stratum, is associated an odds ratio, which is a number that characterizes the likelihood of enforcement module 29 accepting or rejecting false positives. The odds ratio of the following fourfold table:

$$\begin{pmatrix} a & b \\ c & d \end{pmatrix}$$

is equal to $$\frac{ad}{bc},$$

(a, b, c, d corresponding to the conditional probabilities described above.) In the case illustrated in FIG. 4(b), a higher odds ratio for a stratum implies a smaller likelihood of enforcement module 29 accepting a false positive.

For the case of the Location attribute 60, the fourfold table corresponding to a spoken challenge activity is $$\begin{pmatrix} 0.96 & 0.04 \\ 0.01 & 0.99 \end{pmatrix}.$$

That is, the probability of Correct Input (i.e., having a voice signature matching an expected signature within a tolerance) given True User is 0.96, the probability of Correct Input given Fraudster is 0.04, the probability of Incorrect Input given True User is 0.01, and the probability of Incorrect Input given Fraudster is 0.99. Enforcement module 29 derives such probabilities from organization data 34, bootstrapping data 36, and static data 30. The odds ratio for this stratum is 2376. By comparison, the odds ratio for the stratum corresponding to the height attribute 62 is about 496, for the stratum corresponding to the age attribute 64 is about 62.1, and for the stratum corresponding to the time attribute 66 is about 16.6. That is, given the data corresponding to the various sources 30, 32, 34 and 36, enforcement module 29 selects the attribute—and therefore the challenge activity—based on the attribute having the largest odds ratio, as that challenge activity would bring the smallest likelihood of a false positive. Enforcement module 29 also ranks the attributes 60, 62, 64, and 66 according to odds ratio.

In some arrangements, enforcement module 29 selects a challenge activity based on multiple attributes. For example, a challenge activity can be based on both location and height; specifically, the challenge activity is a spoken phrase with more low tones (bootstrapping data 36 shows that tall people above 185 cm have lower frequencies in their vocal signatures). In this case, enforcement module selects the two strata having the largest odds ratios.

In other arrangements, however, enforcement module 29 selects attributes based on a threshold value of a pooled odds ratio of the selected strata. A pooled odds ratio of multiple strata is equal to $$\frac{\sum_{k=1}^{n} a_k d_k}{\sum_{k=1}^{n} b_k c_k}$$

where k is the kth stratum of n total strata, and $a_k$, $b_k$, $c_k$, $d_k$ correspond to the a, b, c, d elements of the kth fourfold table as described above.

The pooled odds ratio corresponding to the strata of location 60 and height 62 attributes is about 837. Including age 64 brings the pooled odds ratio down to about 91; further including time 66 brings the pooled odds ratio down still further to about 61. If enforcement module uses a threshold pooled odds ratio value of 100, then only the location 60 and height 62 attributes are included in the selection of the challenge activity 19.

In still other arrangements, organization data 34 includes a set of policies. For example, if the institutional server is associated with an organization in which employees cannot log in via a smart phone, then attributes depending on using a smart phone (e.g., user height) are labeled as being illegal removed from the possible attributes for ranking. Subsequent rankings are based on a number of legal attributes. In removing such illegal attributes which do not factor into authentication, ranking operations are accomplished more quickly.

Advantageously, the improved technique allows institutional server 14 to reduce the amount of false positives that result from biometric challenge activity 19. The improved technique uses current data from relevant sources to understand human factors in designing challenge activities. For example, bootstrapping data 36 is used to correlate height data with vocal tone and keystroke patterns. The improved technique is also compatible with machine learning systems, in that knowledge of challenge activity results can be fed back into the database for a more fine-tuned design of challenge activities.

FIG. 5 illustrates a method 70 of tailoring a challenge activity to a particular user. In step 72, traits of the particular user are identified from electronic input received from the particular user, the identified traits distinguishing the particular user among users of a user population. In step 74, a set of user attributes are selected from a pool of user attributes based on the identified traits of the particular user, each user attribute being an objectively measurable feature of a user of the user population. In step 76, user attributes of the set of user attributes are incorporated into the challenge activity.

While various embodiments of the invention have been particularly shown and described, it will be understood by those skilled in the art that various changes in form and details may be made therein without departing from the spirit and scope of the invention as defined by the appended claims.

For example, the examples provided above concerned banking institution. Nevertheless, other institutions that hold protected data and thus require authentication services can benefit from such targeted biometric challenge activities. One such institution is a government agency that stores classified documents which certain employees need to access. Other such institutions are medical record repositories and large employers.

Also, the improved technique can work with other, non-biometric types of challenges. For example, a common challenge activity involves user 17 answering questions that were answered by the legitimate user previously. One danger of this is that a fraudster may have observed the legitimate user answering the questions at an insecure site. The improved technique can formulate questions that the legitimate user has a very high probability to answer correctly; for example, one question can ask about the street next to the street on which the legitimate user lived at some point in the past.

Furthermore, it should be understood that some embodiments are directed to authentication server 16 which is constructed and arranged to tailor a challenge activity to a particular user. Some embodiments are directed to authentication server 16. Some embodiments are directed to a system which tailors a challenge activity to a particular user. Some embodiments are directed to a process of tailoring a challenge activity to a particular user. Also, some embodiments are directed to a computer program product which enables computer logic to tailor a challenge activity to a particular user.

In some arrangements, authentication server 16 is implemented by a set of processors or other types of control/processing circuitry running software. In such arrangements, the software instructions can be delivered to authentication server 16 in the form of a computer program product 90 (FIG. 2) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of tailoring a challenge activity to a particular user, the challenge activity being a part of an authentication procedure which is constructed and arranged to authenticate users based on multiple authentication factors, the method comprising:

identifying traits of the particular user from electronic input received from the particular user, the identified traits distinguishing the particular user among users of a user population;

selecting a set of user attributes from a pool of user attributes based on the identified traits of the particular user, each user attribute being an objectively measurable feature of a user of the user population; and incorporating user attributes of the set of user attributes into the challenge activity;

wherein each identified trait of the particular user corresponds to a value of a user attribute of the pool of user attributes;

wherein identifying traits of the particular user includes:

performing a comparison operation on the value of the user attribute for the particular user to which that identified trait corresponds and a value of the user attribute for the user population, results of the comparison operation being used to identify distinguishing traits of the particular user;

wherein the value of the user attribute for the user population is equal to a mean value of the user attribute across the user population;

wherein performing the comparison operation includes:

generating a comparison value based on the value of the user attribute for the particular user and the mean value of the user attribute across the user population; and assessing whether the comparison value satisfies a predetermined set of criteria;

wherein assessing whether the comparison value satisfies the predetermined set of criteria includes:

ranking, in descending order, the user attributes of the pool of user attributes according to the difference between the value of the user attribute and the mean value of the user attribute across the user population for each user attribute of the pool of user attributes to produce a ranked list of user attributes; and wherein selecting the set of user attributes from the pool of user attributes based on the identified traits of the particular user includes:

picking the first N user attributes of the ranked list of user attributes as the set of user attributes, N being a number less than the number of user attributes in the pool of user attributes.

2. A method according to claim 1, wherein at least one user attribute of the pool of user attributes is a static attribute having a value that does not change with the electronic input from the particular user;
  wherein ranking the user attributes of the pool of user attributes includes:
    applying, based on the value of the static attribute, a set of policies to the user attributes of the pool of user attributes to produce a set of illegal attributes, each illegal attribute of the set of illegal attributes belonging to the pool of user attributes; and
    removing the illegal attributes of the set of illegal attributes from the ranked list of attributes to form a ranked list of legal attributes; and
  wherein N is a number less than the number of attributes in the ranked list of legal attributes.

3. A method according to claim 1, wherein ranking the user attributes of the pool of user attributes includes:
  forming a fourfold table for each user attribute of the pool of user attributes, entries of the fourfold table representing probabilities of, respectively, (a) authentication given actual user, (b) authentication given fraudulent user, (c) no authentication given actual user, and (d) no authentication given fraudulent user;
  wherein ranking the user attributes of the pool of user attributes further includes:
    generating, for each user attribute of the pool of user attributes, an odds ratio equal to a ratio of the product of the probabilities (a) and (d) to the product of the probabilities (b) and (c); and
    sorting the pool of user attributes by the odds value assigned to each user attribute of the pool of user attributes to form a sorted pool of user attributes.

4. A method according to claim 3, wherein picking the first N user attributes of the ranked list of user attributes as the set of user attributes includes:
  generating a pooled odds ratio of the first k user attributes of the sorted pool of user attributes, k being a number that is between one and the number of user attributes in the pool of user attributes, the pooled odds ratio being a ratio of a sum of the product of the probabilities (a) and (d) for each of the first k user attributes to a sum of the product of the probabilities (b) and (c) for each of the first k user attributes; and
  selecting, as the number N, the smallest value of k such that the pooled odds ratio is greater than a threshold pooled odds ratio.

5. A system constructed and arranged to tailor a challenge activity to a particular user, the challenge activity being a part of an authentication procedure which is constructed and arranged to authenticate users based on multiple authentication factors, the system comprising:
  a network interface;
  a memory; and
  a controller which includes controlling circuitry coupled to the memory, the controlling circuitry being constructed and arranged to:
    identify traits of the particular user from electronic input received from the particular user, the identified traits distinguishing the particular user among users of a user population;
    select a set of user attributes from a pool of user attributes based on the identified traits of the particular user, each user attribute being an objectively measurable feature of a user of the user population; and
    incorporate the set of user attributes into the challenge activity;
  wherein each identified trait of the particular user is a value of a user attribute of the pool of user attributes for the particular user, the user attribute corresponding to the identified trait;
  wherein identifying traits of the particular user includes:
    performing a comparison operation on the value of the user attribute for the particular user to which that identified trait corresponds and a value of the user attribute for the user population, results of the comparison operation being used to identify distinguishing traits of the particular user;
  wherein the value of the user attribute for the user population is equal to a mean value of the user attribute across the user population;
  wherein performing the comparison operation includes:
    generating a comparison value based on the value of the user attribute for the particular user and the mean value of the user attribute across the user population; and
    assessing whether the comparison value satisfies a predetermined set of criteria;
  wherein assessing whether the difference satisfies a predetermined set of criteria:
    ranking, in descending order, the user attributes of the pool of user attributes according to the difference between the value of the user attribute and the mean value of the user attribute across the user population for each user attribute of the pool of user attributes to produce a ranked list of user attributes; and
  wherein selecting the set of user attributes from the pool of user attributes based on the identified traits of the particular user includes:
    picking the first N user attributes of the ranked list of user attributes as the set of user attributes, N being a number less than the number of user attributes in the pool of user attributes.

6. A system according to claim 5, wherein at least one user attribute of the pool of user attributes is a static attribute having a value that does not change with the electronic input from the particular user;
  wherein ranking the user attributes of the pool of user attributes includes:
    applying, based on the value of the static attribute, a set of policies to the user attributes of the pool of user attributes to produce a set of illegal attributes, each illegal attribute of the set of illegal attributes belonging to the pool of user attributes; and
    removing the illegal attributes of the set of illegal attributes from the ranked list of attributes to form a ranked list of legal attributes; and
  wherein N is a number less than the number of attributes in the ranked list of legal attributes.

7. A system according to claim 5, wherein ranking the user attributes of the pool of user attributes includes:
  forming a fourfold table for each user attribute of the pool of user attributes, entries of the fourfold table representing probabilities of, respectively, (a) authentication given actual user, (b) authentication given fraudulent user, (c) no authentication given actual user, and (d) no authentication given fraudulent user;

wherein ranking the user attributes of the pool of user attributes further includes:
  generating, for each user attribute of the pool of user attributes, an odds ratio equal to a ratio of the product of the probabilities (a) and (d) to the product of the probabilities (b) and (c); and
  sorting the pool of user attributes by the odds value assigned to each user attribute of the pool of user attributes to form a sorted pool of user attributes.

8. A system according to claim 7, wherein picking the first N user attributes of the ranked list of user attributes as the set of user attributes includes:
  generating a pooled odds ratio of the first k user attributes of the sorted pool of user attributes, k being a number that is between one and the number of user attributes in the pool of user attributes, the pooled odds ratio being a ratio of a sum of the product of the probabilities (a) and (d) for each of the first k user attributes to a sum of the product of the probabilities (b) and (c) for each of the first k user attributes; and
  selecting, as the number N, the smallest value of k such that the pooled odds ratio is greater than a threshold pooled odds ratio.

9. A computer program product having a non-transitory, computer-readable storage medium which stores code to tailor a challenge activity to a particular user, the code including instructions to:
  identify traits of the particular user from electronic input received from the particular user, the identified traits distinguishing the particular user among users of a user population;
  select a set of user attributes from a pool of user attributes based on the identified traits of the particular user, each user attribute being an objectively measurable feature of a user of the user population; and
  incorporate the set of user attributes into the challenge activity;

wherein each identified trait of the particular user corresponds to a value of a user attribute of the pool of user attributes;
wherein identifying traits of the particular user includes:
performing a comparison operation on the value of the user attribute for the particular user to which that identified trait corresponds and a value of the user attribute for the user population, results of the comparison operation being used to identify distinguishing traits of the particular user;
wherein the value of the user attribute for the user population is equal to a mean value of the user attribute across the user population;
wherein performing the comparison operation includes:
  generating a comparison value based on the value of the user attribute for the particular user and the mean value of the user attribute across the user population; and
assessing whether the comparison value satisfies a predetermined set of criteria;
wherein assessing whether the comparison value satisfies the predetermined set of criteria:
ranking, in descending order, the user attributes of the pool of user attributes according to the difference between the value of the user attribute and the mean value of the user attribute across the user population for each user attribute of the pool of user attributes to produce a ranked list of user attributes; and
wherein selecting the set of user attributes from the pool of user attributes based on the identified traits of the particular user includes:
picking the first N user attributes of the ranked list of user attributes as the set of user attributes, N being a number less than the number of user attributes in the pool of user attributes.

\* \* \* \* \*